United States Patent
Smith et al.

(10) Patent No.: US 11,168,743 B2
(45) Date of Patent: Nov. 9, 2021

(54) SHIFT ISOLATION LEVER SYSTEM FOR POWER-ACTUATED COUPLING DEVICE

(71) Applicant: Magna Powertrain of America, Inc., Troy, MI (US)

(72) Inventors: Wade Smith, Mussey, MI (US); Ryan Shaw, Southfield, MI (US); Bradley Ketchel, Oxford, MI (US)

(73) Assignee: MAGNA POWERTRAIN OF AMERICA INC., Troy, MI (US)

( * ) Notice: Subject to any disclaimer, the term of this patent is extended or adjusted under 35 U.S.C. 154(b) by 59 days.

(21) Appl. No.: 16/615,959

(22) PCT Filed: May 18, 2018

(86) PCT No.: PCT/US2018/033294
§ 371 (c)(1),
(2) Date: Nov. 22, 2019

(87) PCT Pub. No.: WO2018/217546
PCT Pub. Date: Nov. 29, 2018

(65) Prior Publication Data
US 2020/0096054 A1 Mar. 26, 2020

Related U.S. Application Data

(60) Provisional application No. 62/509,850, filed on May 23, 2017.

(51) Int. Cl.
*F16D 23/14* (2006.01)
*B60K 17/02* (2006.01)
(Continued)

(52) U.S. Cl.
CPC .............. *F16D 23/14* (2013.01); *B60K 17/02* (2013.01); *B60K 17/344* (2013.01); *F16D 11/14* (2013.01);
(Continued)

(58) Field of Classification Search
CPC .......... F16D 23/14; F16D 11/14; F16D 28/00; F16D 2011/002; F16D 2011/141;
(Continued)

(56) References Cited

U.S. PATENT DOCUMENTS 2,715,217 A * 8/1955 Russell ................. F16H 63/304
340/456
4,770,280 A 9/1988 Frost
(Continued)

FOREIGN PATENT DOCUMENTS

| DE | 2521139 | * 11/1976 |
| FR | 2630055 A1 | 1/1989 |
| WO | WO2013/135990 | * 9/2013 |

OTHER PUBLICATIONS

Machine Language translation of DE2521139.*
(Continued)

*Primary Examiner* — Mark A Manley
(74) *Attorney, Agent, or Firm* — Dickinson Wright PLLC

(57) ABSTRACT

A clutch assembly incorporated into a power transfer assembly (72) of a motor vehicle is presented. The clutch assembly includes a power-operated clutch actuator (306) for moving a clutch sleeve (354) axially between released and engaged positions between two rotatory members. In the released position, relative rotation between two rotary members is prevented. Whereas in the engaged position, relative rotation is permitted. The power-operated clutch actuator (306) further includes an electromagnetic solenoid with an output member having an extended condition and a retracted condition urging the clutch sleeve (354) between positions. A shift isolation linkage mechanism (304) interconnects the output member of the solenoid to the clutch sleeve (354) and permits movement of the output member to its retracted position while a blocked tooth condition inhibits movement of the clutch sleeve (354) to its engaged position. Once the
(Continued)

blocked tooth condition is removed, the isolation linkage mechanism (304) forces the clutch sleeve (354) to its engaged position.

14 Claims, 12 Drawing Sheets

(51) Int. Cl.
  *B60K 17/344* (2006.01)
  *F16D 11/14* (2006.01)
  *F16D 28/00* (2006.01)
  *F16D 11/00* (2006.01)
  *B60K 17/354* (2006.01)

(52) U.S. Cl.
  CPC ............ *F16D 28/00* (2013.01); *B60K 17/354* (2013.01); *F16D 2011/002* (2013.01); *F16D 2011/006* (2013.01); *F16D 2023/141* (2013.01)

(58) Field of Classification Search
  CPC .... B60K 17/02; B60K 17/344; B60K 17/354; B60K 17/34; F16H 63/34; F16H 2063/3089
  See application file for complete search history.

(56) References Cited

U.S. PATENT DOCUMENTS

2006/0046888 A1   3/2006   Puiu
2015/0059508 A1   3/2015   Ekonen et al.

OTHER PUBLICATIONS

International Search Report and Written Opinion of International Searching Authority for International Application No. PCT/US2018/033294 dated Aug. 1, 2018; 9 pages.

\* cited by examiner

SHIFT ISOLATION LEVER SYSTEM FOR POWER-ACTUATED COUPLING DEVICE

CROSS-REFERENCE TO RELATED APPLICATIONS

This application is a U.S. National Stage of Patent Application Serial No. PCT/US2018/033294 filed May 18, 2018, which claims the benefit of and priority to U.S. Provisional Application Ser. No. 62/509,850 filed May 23, 2017. The entire disclosure of each of the above application are incorporated herein by reference.

FIELD

The present disclosure relates generally to power-operated shift systems in power transfer assemblies used in motor vehicle driveline applications. More specifically, the present disclosure is directed to a power-operated clutch actuator for moving a clutch sleeve between released and engaged positions and having a solenoid actuator and a pivotable shift isolation mechanism coupling the solenoid actuator to the clutch sleeve.

BACKGROUND

This section provides background information which is not necessarily prior art to the inventive concepts associated with the present disclosure.

Interest in four-wheel drive (4WD) and all-wheel drive (AWD) vehicles has led to development of power transfer systems configured to selectively and/or automatically direct rotary power (i.e. drive torque) from the powertrain to all four wheels of the vehicle. In many four-wheel drive vehicles, the power transfer system includes a transfer case configured to drivingly interconnect the powertrain to front and rear drivelines. More particularly, a majority of current transfer cases are configured to include a mainshaft or rear output shaft interconnecting the powertrain to the rear driveline, a front output shaft interconnected to the front driveline, a transfer assembly drivingly interconnected to the front output shaft, a mode clutch for selectively coupling the transfer assembly to the rear output shaft, and a clutch actuator for controlling actuation of the mode clutch. The mode clutch is operable in a first or "released" state to disconnect the front output shaft from the rear output shaft and establish a two-wheel drive mode (2WD) with all drive torque transmitted from the powertrain to the rear driveline. The mode clutch is also operable in a second or "engaged" state to drivingly connect the front output shaft (via the transfer assembly) to the rear output shaft and establish a four-wheel drive mode (4WD) with drive torque transmitted from the powertrain to both of the front and rear drivelines.

In many all-wheel drive vehicles, the power transfer system includes a power take-off unit (PTU) configured to connect the powertrain to the rear driveline in conjunction with a front-wheel drive drivetrain arrangement. Typically, the mode clutch is operable in its released state to disconnect the rear driveline (i.e. rear propshaft and rear axle) from the powertrain. In contrast, the mode clutch is operable in its engaged state to connect the front axle differential (i.e. transaxle output) to a hypoid gearset drivingly connected to the rear propshaft.

In both 4WD and AWD vehicles, it is further known to equip the secondary driveline (i.e. front axle in 4WD systems and rear axle in AWD systems) with a disconnect clutch to provide a "disconnect" function when the mode clutch is operating in its released state. Thus, the use of mode clutches and disconnect clutches are well known in power transfer systems. Such clutches typically are configured as positive-locking couplings having an axially-moveable clutch sleeve operably disposed between a pair of rotary components. Movement of the clutch sleeve to a first position permits relative rotation between the two rotary components and establishes the released state. Likewise, movement of the clutch sleeve to a second position prevents relative rotation between the two rotary components and establishes the engaged state. In many instances a power-operated clutch actuator is employed to move the clutch sleeve between its two distinct operating positions. However, the power-operated clutch actuator must be operable to accommodate "blocked" shifts into the engaged state and function to complete the mode shift once the blocked condition is eliminated. To address this blocked shift requirement, some arrangements employ a spring-loaded mechanism between the power-operated clutch actuator and the clutch sleeve so as to limit the power output requirements and improve the service life of the power-operated clutch actuator.

Thus, a recognized need exists to develop alternative power-operated shift systems that addresses the block shift requirement, addresses the technology, and provides enhanced configurations that improve upon otherwise conventional power-operated shift systems.

SUMMARY

This section provides a general summary of the inventive concepts associated with the present disclosure and is not intended to be interpreted as a complete and thoroughly comprehensive disclosure of all of its aspects, features, advantages and/or objectives.

It is an aspect of the present disclosure to provide a clutch assembly having a shift isolation mechanism for biasing a clutch sleeve towards an engaged position from a disengaged position when the clutch assembly is in a blocked tooth condition that inhibits movement of the clutch sleeve. After the blocked tooth condition is eliminated, the shift isolation mechanism forcibly moves the clutch sleeve into the engaged position thus permitting conjoint rotation of two rotary members via pairing of the clutch sleeve.

It is a further aspect of the present disclosure to provide a power-operated clutch actuator having an output member moveable between an extended position and a retracted position corresponding movement of the clutch sleeve.

It is another aspect of the present disclosure to integrate the clutch assembly into a power operated shift system of an automobile.

In accordance with these and other aspects, the present disclosure provides a clutch assembly comprising a first rotary member and second rotary member of an automobile. A clutch sleeve is coupled for rotation with the first rotary member and is axially moveable between a first position and a second position. In the first position, the clutch sleeve has first clutch teeth disengaged from second clutch teeth formed on the second rotary member. In the second position, the first clutch teeth on the clutch sleeve are engaged with the second clutch teeth. A power-operated clutch actuator has an output member moveable between a first position and a second position. A shift isolation mechanism operably interconnects the output member to the clutch sleeve such that movement of the output member between its first and second positions causes corresponding movement of the clutch sleeve between its first and second positions. The shift isolation mechanism includes a biasing arrangement configured to permit movement of the output member from its first position to its second position while a blocked tooth condition between the first and second clutch teeth inhibits movement of the clutch sleeve from its first position to its second position. After the tooth blocked condition is removed, the spring-loaded arrangement is released to forcibly move the clutch sleeve from its first position to its second position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding numbers are used throughout the views to identify corresponding components.

DETAILED DESCRIPTION

Figure 1:
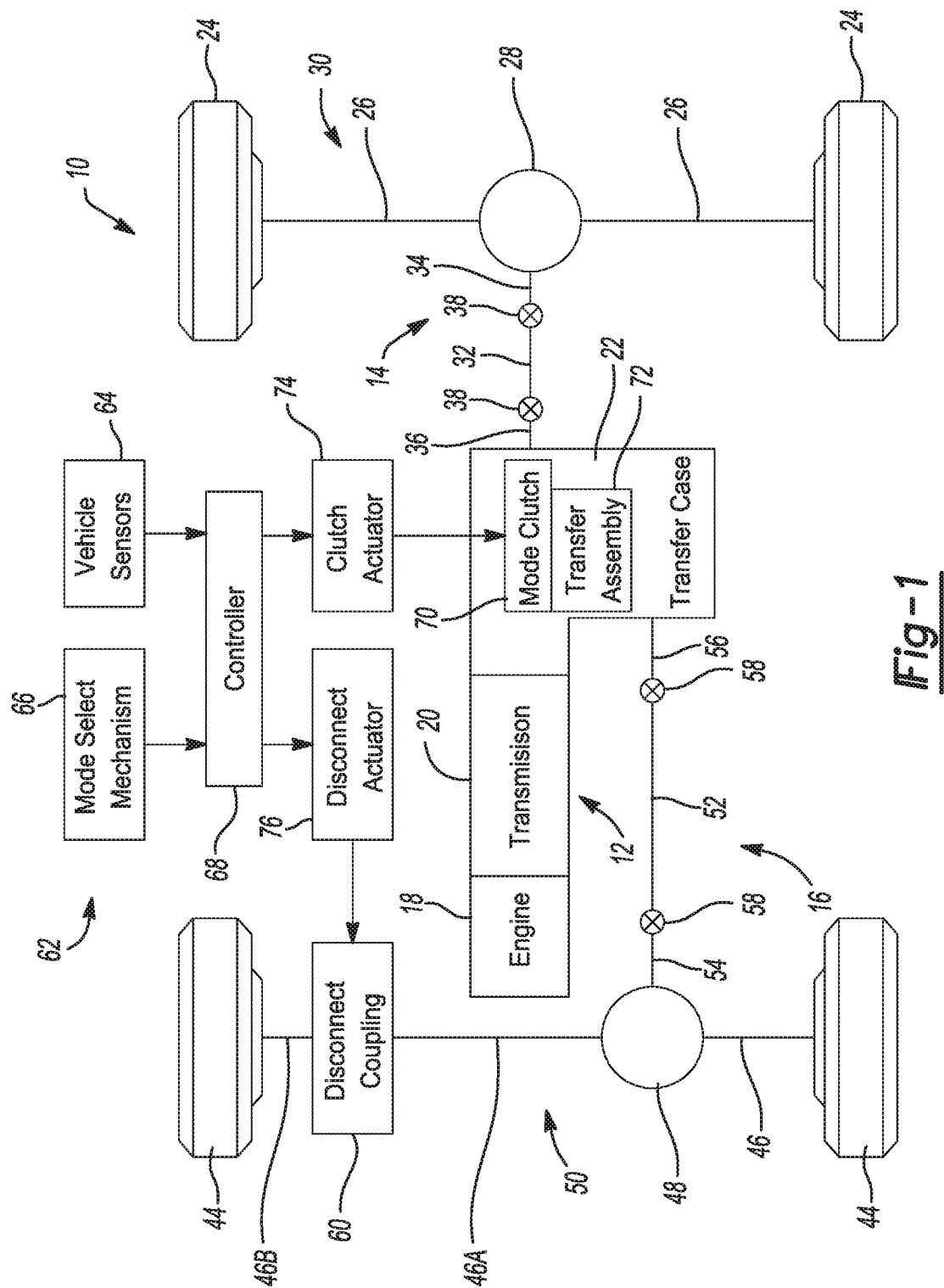
FIG. 1 is a schematic illustration of a four-wheel drive motor vehicle configured to be equipped with power transfer assembly and/or torque transfer couplings that are constructed in accordance with the teachings of the present disclosure.

Example embodiments will now be described. However, these specific example embodiments are provided so that this disclosure will be thorough and will fully convey the intended scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known device structures and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Referring initially to FIG. 1 of the drawings, an example of a four-wheel drive motor vehicle 10 is shown to generally include a longitudinally-extending (i.e. north/south configuration) powertrain 12 operable for generating rotary power (i.e. drive torque) to be transmitted to a first or rear driveline 14 and a second or front driveline 16. Powertrain 12 is shown to include an internal combustion engine 18, a multi-speed transmission 20, and a transfer case 22. In the particular arrangement shown, rear driveline 14 is the primary driveline and is configured to include a pair of ground-engaging rear wheels 24 drivingly connected via corresponding rear axleshafts 26 to a rear differential assembly 28 associated with a rear axle assembly 30. Rear driveline 14 also includes a rear propshaft 32 arranged to interconnect a rotary input 34 of rear differential assembly 28 to a rear output shaft 36 of transfer case 22. A pair of rear joint units 38 are shown to interconnect opposite ends of rear propshaft 32 to rotary input 34 of rear differential assembly 28 and rear output shaft 36 of transfer case 22 and which function to transmit drive torque while permitting angular and/or translational movement therebetween.

Front driveline 16 is the secondary driveline and is shown in FIG. 1 of the drawings configured to include a pair of front ground-engaging wheels 44 drivingly interconnected via corresponding front axleshafts 46 to a front differential assembly 48 associated with a front axle assembly 50. Front driveline 16 also includes a front propshaft 52 arranged to interconnect a rotary input 54 of front differential assembly 48 to a front output shaft 56 of transfer case 22. A pair of front joint units 58 interconnect opposite ends of front propshaft 52 to rotary input 54 of front differential assembly 48 and front output shaft 56 of transfer case 22 and function to transmit drive torque while permitting angular and/or translational movement therebetween. A disconnect coupling 60 is also associated with front driveline 16 and is shown operably disposed between a pair of shaft segments 46A, 46B of one of front axleshafts 46. Disconnect coupling 60 is operable in a first or "connected" mode to drivingly couple front wheels 44 to the remainder of front driveline 16 and is further operable in a second or "disconnected" mode to uncouple front wheels 44 from driven connection with the reminder of front driveline 16.

Powertrain 12 is also shown in FIG. 1 to be operably associated with a powertrain control system 62 generally including a group of vehicle sensors 64 and a mode selector 66, both of which provide signals which communicate with a vehicle controller 68. Vehicle controller 68 can include one or more individual controllers associated with engine 18, transmission 20, transfer case 22 and disconnect coupling 60 which are configured to control motive operation of vehicle 10. Powertrain control system 62 is shown to provide an electronically-controlled power transfer system configured to permit a vehicle operator to select between a two-wheel drive (2WD) mode and a part-time or "locked" four-wheel drive (LOCK-4WD) mode. In this regard, transfer case 22 is equipped with a mode clutch 70 and a transfer assembly 72 configured to transfer drive torque to front driveline 16 when one of the four-wheel drive modes is selected. As will be detailed hereafter with greater specificity, mode clutch 70 functions to selectively transmit drive torque from rear output shaft 36 to front output shaft 56 via transfer assembly 72.

The power transfer system is shown to also include a power-operated clutch actuator 74 for controlling actuation of mode clutch 70, and a power-operated disconnect actuator 76 for controlling actuation of disconnect coupling 60. Controller 68 controls coordinated actuation of power-operted actuators 74, 76 in response to input signals from vehicle sensors 64 and mode signals from mode select mechanism 66. Vehicle sensors 64 are arranged and configured to detect certain dynamic and operational characteristics of vehicle 10 and/or current weather or road conditions.

To establish the 2WD mode, clutch actuator 74 is controlled to shift mode clutch 70 into a first or "released" mode while disconnect actuator 76 is controlled to shift disconnect coupling 60 into its disconnected mode. With mode clutch 70 in its released mode, no drive torque is transmitted through transfer assembly 72 to front output shaft 56 such that all drive torque generated by powertrain 12 is delivered to rear wheels 24 via rear driveline 14.

To establish the LOCK-4WD mode, disconnect actuator 76 is controlled to shift disconnect coupling 60 into its connected mode and clutch actuator 74 is controlled to shift mode clutch 70 into a second or "fully-engaged" mode. With mode clutch 70 operating in its fully-engaged mode, rear output shaft 36 is, in effect, drivingly coupled to front output shaft 56 via transfer assembly 72 such that drive torque is equally distributed (i.e. 50/50) therebetween. With disconnect coupling 60 in its connected mode, shaft segments 46A, 46B are drivingly coupled together such that drive torque delivered to front output shaft 56 is transferred via front driveline 16 to front wheels 44.

Figure 2:
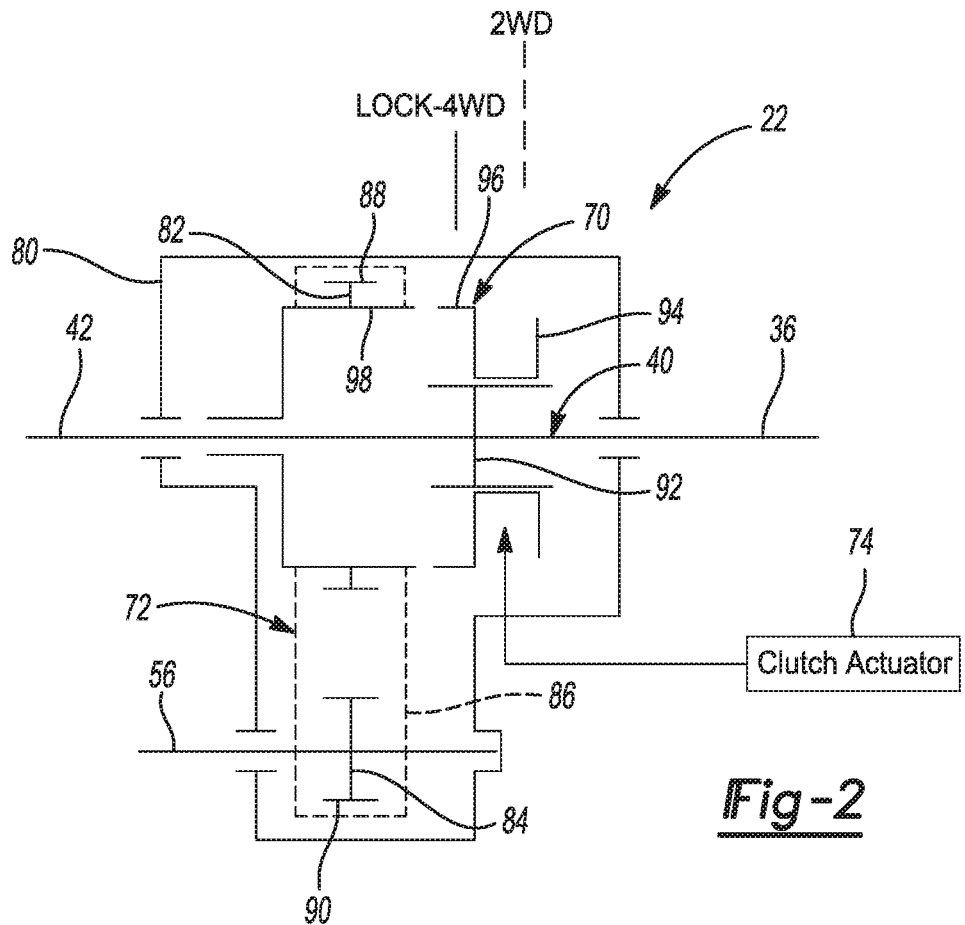
FIG. 2 is a diagrammatical view of a transfer case shown in FIG. 1 and equipped with a power-operated mode clutch arrangement in accordance with the present disclosure.

With reference to FIG. 2, transfer case 22 is shown in diagrammatic format to include a t-case housing 80, input shaft 42, rear output shaft 36, front output shaft 56, transfer assembly 72, mode clutch 70, and power-operated mode clutch actuator 74. Mainshaft 40 is a combination of input shaft 42 and rear output shaft 36 integrated into a common shaft in this one-speed version of transfer case 22. Transfer assembly 72 includes a first sprocket 82 rotatably supported on mainshaft 40, a second sprocket 84 fixed to front output shaft 56, and a continuous power chain 86 encircling and meshed with teeth 88 on first sprocket 82 and teeth 90 on second sprocket 84. Mode clutch 70 is a positively-locking type of clutch having a clutch hub 92 fixed for rotation with mainshaft 40, and an axially-moveable clutch sleeve 94 splined for rotation with and axial movement relative to clutch hub 92. Mode sleeve 94 is moveable on clutch hub 92 between a first (i.e., released) or 2WD position and a second (i.e., engaged) or LOCK-4WD position. In the 2WD position, external clutch teeth 96 on clutch sleeve 94 are disengaged from meshed engagement with internal clutch teeth 98 formed on first sprocket 82. In the LOCK-4WD position, clutch teeth 96 on clutch sleeve 94 are in meshed engagement with clutch teeth 98 on first sprocket 82, whereby front output shaft 56 is coupled for common rotation with mainshaft 40. Clutch actuator 74 is shown schematically and is operable to control movement of clutch sleeve 94 between its two distinct mode positions in response to a mode signal provided by mode selector 66 to controller 68. As will be detailed hereinafter, mode clutch actuator 74 is configured to include a powered clutch actuator and a spring-loaded isolation linkage mechanism configured to interconnect an output of the powered clutch actuator to mode sleeve 94.

Figure 3:
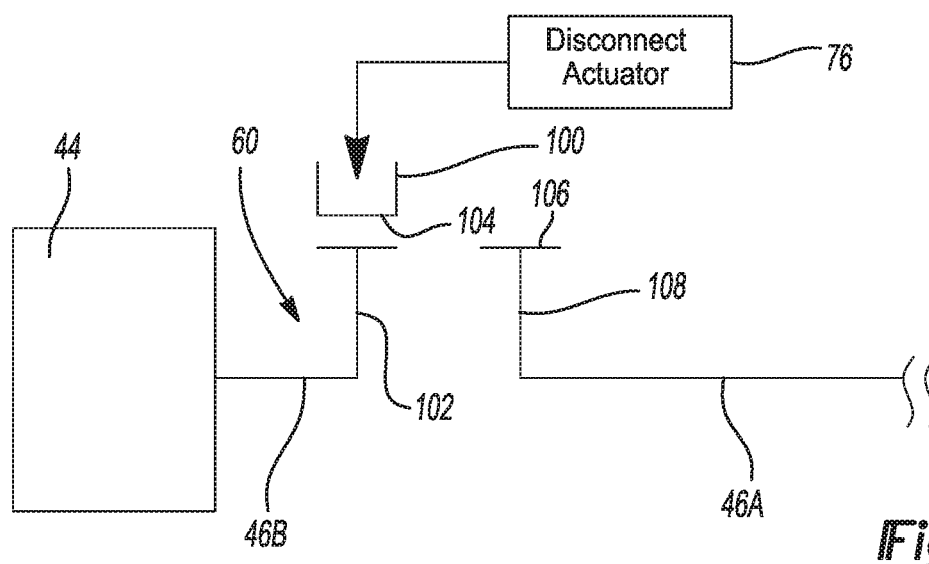
FIG. 3 is a diagrammatical view of a disconnect-type torque transfer coupling equipped with a power-operated disconnect clutch arrangement in accordance with the present disclosure.

With reference now to FIG. 3, disconnect coupling 60 is shown in diagrammatical format to include a disconnect sleeve 100 splined to a first clutch hub 102 that is fixed for rotation with axleshaft portion 46B and which is axially-moveable thereon between a first (i.e., released) or disconnect position and a second (i.e., engaged) or connect position. In the disconnect position shown, internal clutch teeth 104 on disconnect sleeve 100 are disengaged from external clutch teeth 106 formed on a second clutch hub 108 which is fixed for rotation with axleshaft portion 46A so as to establish a disconnected mode with front wheel 44 uncoupled from the remainder of front axle assembly 50. In the connect position, clutch teeth 104 on disconnect sleeve 100 are meshed with clutch teeth 106 on second clutch hub 108 so as to establish a connected mode with front wheel 44 drivingly connected to front axle assembly 50. Disconnect actuator 76 is shown schematically and is operable to control movement of disconnect sleeve 100 between its two distinct positions in response to the mode signal. In operation, disconnect sleeve 100 is positioned in its disconnect position when transfer case 22 is operating in its 2WD mode and is positioned in its connect position when transfer case 22 is operating in its LOCK-4WD mode. As will be detailed hereinafter, disconnect actuator 76 is configured to include a powered clutch actuator and a spring-loaded isolation linkage mechanism configured to interconnect an output of the powered clutch actuator to disconnect sleeve 100.

In general, the present disclosure also relates to a coupling system and/or a disconnect system for use in a driveline of a motor vehicle. A power take-off unit may be equipped with a mode clutch to disconnect the powertrain from a portion of the driveline and to subsequently reconnect to the driveline. Additionally, another disconnect clutch may be provided to disconnect a portion of the driveline from the vehicle wheels. The hypoid gearing of the vehicle driveline may be separated from the powertrain to reduce churning losses and other mechanical inefficiencies.

Figure 4:
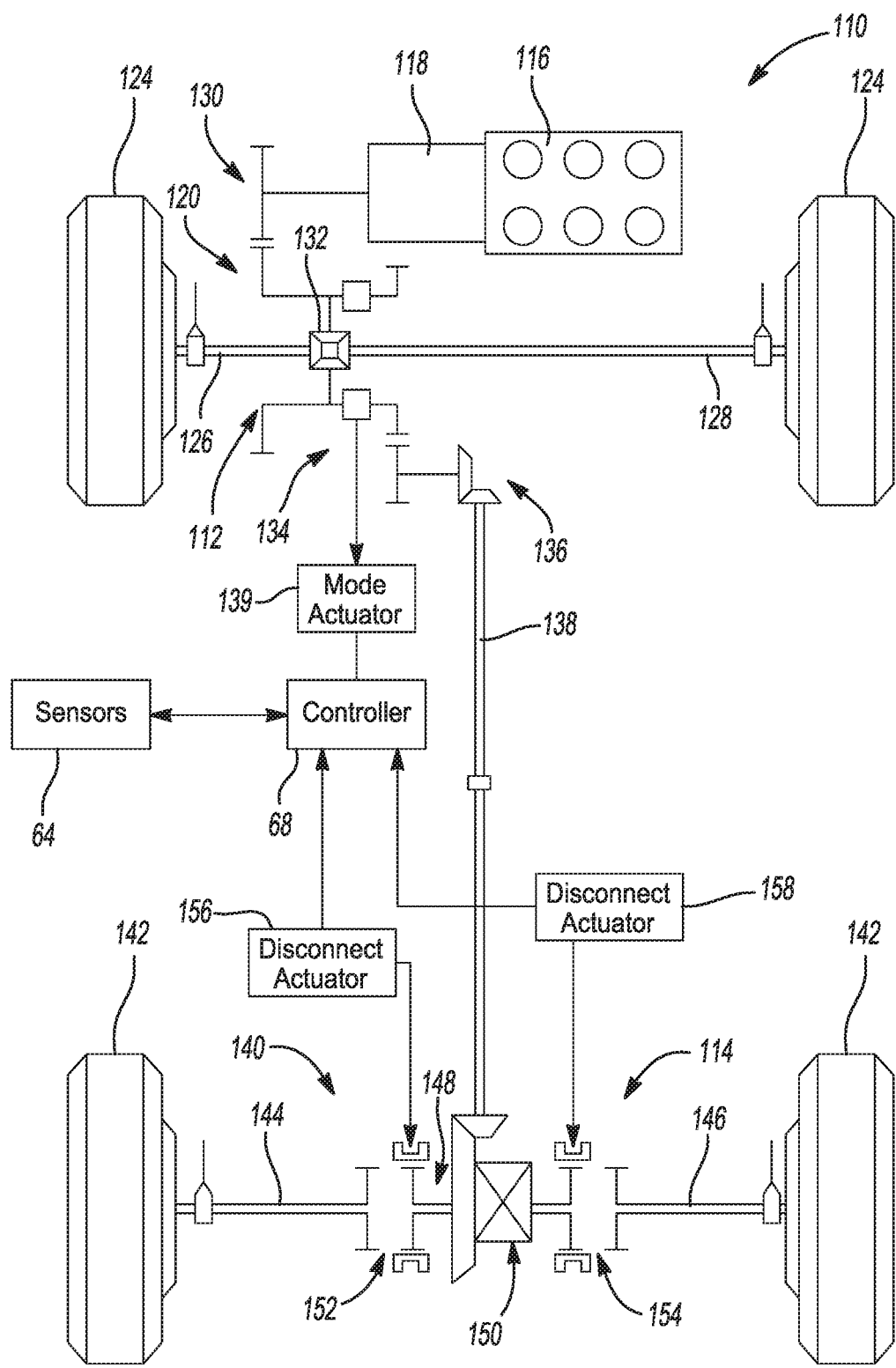
FIG. 4 is a schematic view of an all-wheel drive vehicle configured to be equipped with a power transfer assembly and at least one torque transfer coupling in accordance with the present disclosure.

With particular reference to FIG. 4 of the drawings, a drive train 110 of an all-wheel drive vehicle is shown. Drive train 110 includes a front driveline 112 and a rear driveline 114 both drivable from a source of power, such as an engine 116 through a transmission 118 which may be of either the manual or automatic type. In the particular embodiment shown, drive train 110 is an all-wheel system incorporating a power transfer assembly 120 for transmitting drive torque from engine 116 and transmission 118 to front driveline 112 and rear driveline 114. Power transfer assembly 120 is shown as a power take-off unit (PTU).

Front driveline 112 is shown to include a pair of front wheels 124 individually driven by a first axle shaft 126 and a second axle shaft 128. Front driveline 112 also includes a reduction speed gearset 130 and a differential assembly 132. PTU 120 includes a mode clutch 134, a right-angled drive assembly 136, and a powered mode clutch actuator 139.

Rear driveline 114 includes a propeller shaft 138 connected at a first end to right-angled drive assembly 136 and at an opposite end to a rear axle assembly 140. Rear Driveline 114 also includes a pair of rear wheels 142 individually driven by a first rear axle shaft 144 and a second rear axle shaft 146. Rear axle assembly 140 also includes a hypoid ring and pinion gearset 148 driving a rear differential assembly 150.

First and second disconnect coupling 152 and 154 selectively drivingly disconnect first and second rear axle shafts 144, 146 from ring and pinion gearset 148 and rear differential assembly 150. First and second disconnect coupling 152, 154 may be configured as dog clutches. First disconnect coupling 152 is shown to include an axially-moveable first disconnect sleeve. A first disconnect actuator 156 is shown schematically for controlling movement of the first disconnect sleeve between is connected and disconnected positions. Likewise, a second disconnect actuator 158 is schematically shown for controlling movement of a second axially-moveable disconnect sleeve associated with second disconnect coupling 154. As will be detailed hereinafter, disconnect actuators 156, 158 are each configured to include a powered clutch actuator and a spring-loaded isolation linkage mechanism configured to interconnect an output of the corresponding powered clutch actuator to the disconnect clutch sleeve.

Figure 5:
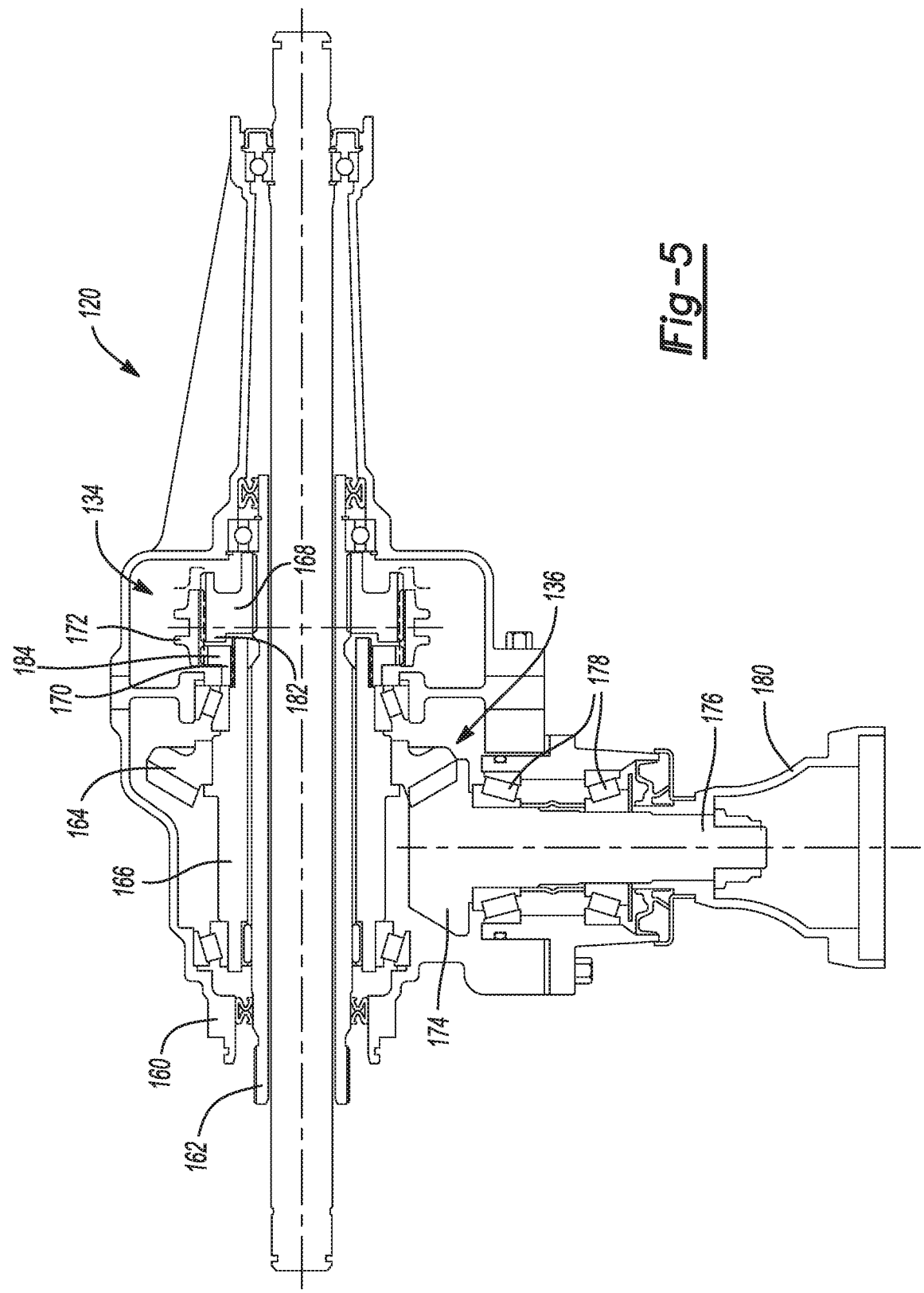
FIG. 5 is a sectional view of a power take-off unit (PTU) shown in FIG. 4 and equipped with a power-operated mode clutch arrangement in accordance with the present disclosure.

FIG. 5 illustrates a non-limiting embodiment of PTU 120 to include a housing 160 which supports an input shaft 162. Input shaft 162 is drivingly coupled to the drive carrier of front differential 132. A drive gear 164 is fixed to a transfer shaft 166. Mode clutch 134 selectively couples transfer shaft 166 to input shaft 162 and includes an input hub 168 fixed to input shaft 162, an output hub 170 fixed to transfer shaft 166, and a mode clutch sleeve 172. Drive gear 164 meshes with a pinion gear 174 to define hypoid gearset 136. Pinion gear 174 is integrally formed with a pinion shaft 176 supported in housing 160 via a pair of laterally-spaced bearings 178. A coupling 180 is provided to interconnect pinion shaft 176 to rear propshaft 138. Mode sleeve 172 is splined for rotation with and axial movement on input hub 168 between an engaged position (shown) and a disengaged position. In its AWD or engaged position, its clutch teeth 182 are meshed with clutch teeth 184 on output hub 170, thereby transmitting drive torque from input shaft 162 to propshaft 138 via hypoid gearset 136. In its 2WD or disengaged position, clutch sleeve 172 is released from output hub 170. As will be detailed, power-operated PTU clutch actuator 139 controls such movement of clutch sleeve 172.

Figure 6:
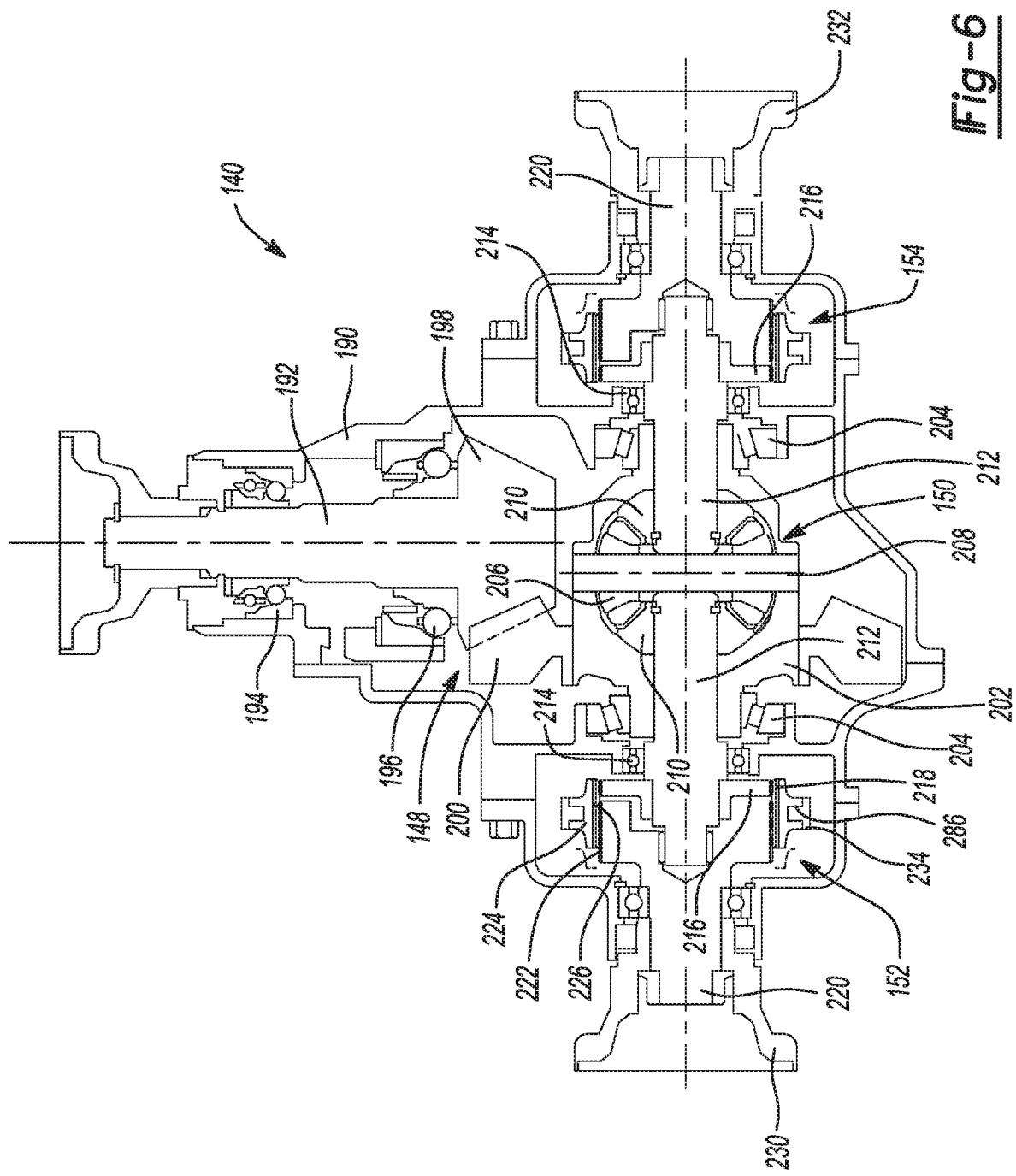
FIG. 6 is a sectional view of a rear axle assembly shown in FIG. 4 and equipped with a power-operated disconnect clutch arrangement.
Figure 7:
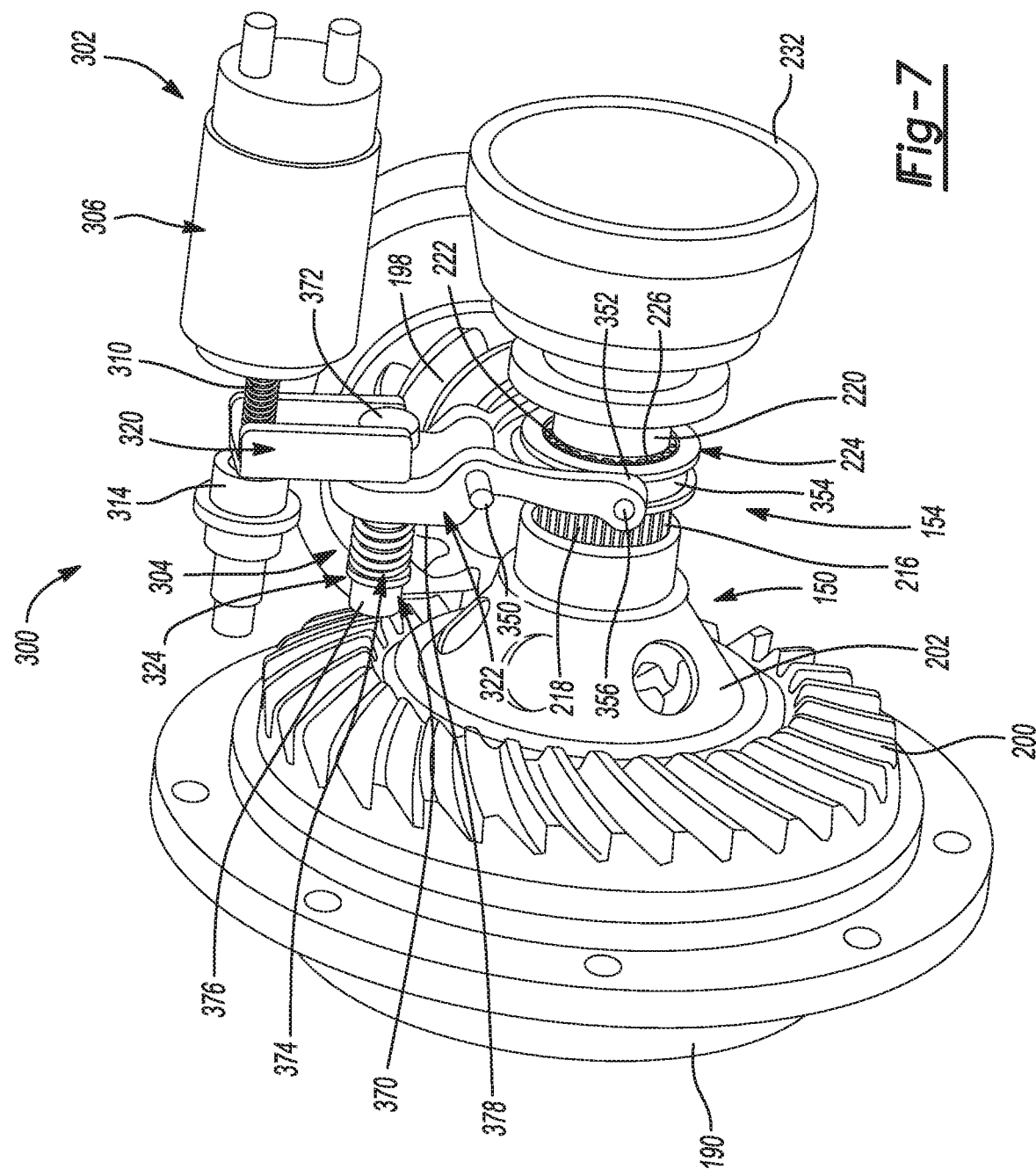
FIG. 7 is an isometric view of a portion of the rear axle assembly shown in FIGS. 4 and 6, now illustrating a powered clutch actuator and a shift isolation mechanism associated with the power-operated disconnect clutch arrangement in more detail.

FIG. 6 depicts a portion of rear axle assembly 140. A housing 190 rotatably supports a pinion shaft 192 of ring and pinion gearset 148 via bearings 194, 196. A pinion gear 198 is integrally formed with pinion shaft 192. Ring and pinion gearset 148 also includes a ring gear 200 in meshed engagement with pinion gear 198 and fixed for rotation with a carrier 202. Carrier 202 is rotatably supported within housing 190 by bearings 204. Differential assembly 150 includes a pair of pinion gears 206 supported on a cross pin 208 fixed to carrier 202. A pair of side gears 210 are in meshed engagement with pinion gears 206. Side gears 210 are fixed for rotation with stub shafts 212. Bearings 214 rotatably support stub shafts 212 within housing 190.

Disconnect coupling 152 is substantially similar to disconnect coupling 154. Each disconnect includes a drive flange 216 fixed for rotation with its associated stub shaft 212. A plurality of external circumferentially spaced apart teeth 218 are formed on drive flange 216. A driven spindle 220 is rotatably supported on a distal end of stub shaft 212. A plurality of external circumferentially spaced apart teeth 222 are formed on driven spindle 220. A disconnect sleeve 224 includes a plurality of internal teeth 226. Disconnect sleeve 224 is axially moveable between a connected and a disconnected position. In the disconnected position, teeth 226 of disconnect sleeve 224 engage only teeth 222 of spindle 220. In the connected position, teeth 226 concurrently engage both teeth 222 of spindle 220 and teeth 218 formed on drive flange 216. Output flanges 230, 232 drivingly couple spindles 220 with first and second rear axle shafts 144, 146 respectively. A shift fork 234 engages a groove 286 formed in disconnect sleeve 224. A power-operated disconnect actuator, to be disclosed, axially translates shift fork 234 to position disconnect sleeve 224 at one of the connected position and the disconnected position. In the connected position, torque is transferred between drive flange 216 and spindle 220 by disconnect sleeve 224. In the disconnected position, disconnect sleeve 224 does not drivingly engage drive flange 216 and torque is not transferred between stub shaft 212 and spindle 220.

During vehicle operation, it may be advantageous to reduce the churning losses associated with driving ring and pinion gearset 148 and right-angled drive assembly 136. Controller 68 is in communication with a variety and right-angled drive assembly 136. Controller 68 is in communication with a variety of vehicle sensors 64 providing data indicative of parameters such as vehicle speed, four-wheel drive mode, wheel slip, vehicle acceleration and the like. At the appropriate time, controller 68 outputs a signal to PTU actuator 139 to place mode clutch 134 in the deactuated mode where torque is not transferred from engine 116 to rear driveline 114. Controller 68 also signals the disconnect actuators associated with disconnect 152 and disconnect 154 to place shift forks 234 into their disconnected positions such that energy associated with rotating rear wheels 142 will not be transferred to ring and pinion gearset 148 or differential assembly 150. Accordingly, the hypoid gearsets do not rotate at the rotational output speed of differential assembly 132, nor do they rotate at the rotational speed of rear wheels 142. The hypoid gearsets are disconnected from all sources of power and are not driven at all.

Referring now to FIGS. 7 through 12, a non-limiting embodiment of a power-operated shift system 300 is disclosed for axially moving a clutch or disconnect sleeve between first and second positions to established engaged and disengaged positions. In this particular example, power-operated shift system 300 is configured to axially move disconnect sleeve 224 between its connected and disconnected position to corresponding couple and uncouple stub shaft 212 with respect to driven spindle 220. Shift system 300 is shown in associated with second disconnect coupling 154, but those skilled will also appreciate that the following detailed description will clearly indicate its applicability to first disconnect coupling 152, PTU mode clutch 134, disconnect coupling 60 (FIGS. 1 and 3), and mode clutch 70 (FIGS. 1 and 2). In general, shift system 300 include a powered actuator 302 and a spring-loaded shift isolation mechanism 304. Powered actuator 302 maybe any type of electromechanical or electrohydraulic device having an output member moveable between a first or extended position and a second or retracted position, relative to an actuator housing 306, in response to an electrical control signal provided by controller 68. In this non-limiting embodiment, power actuator 302 is a solenoid device.

Figure 8:
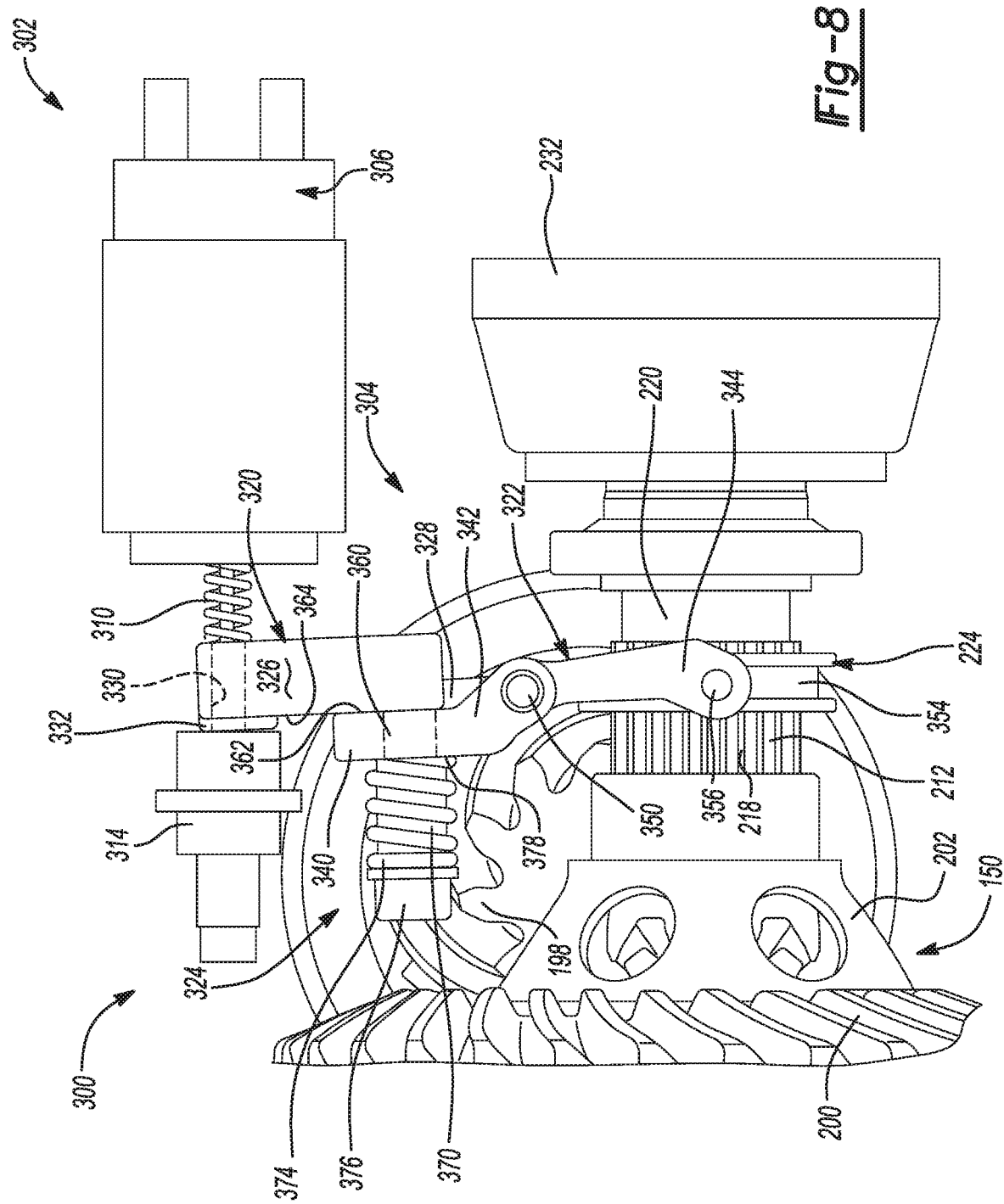
FIG. 8 is similar to FIG. 7 and illustrates the orientation and positioning of the components when the axially-moveable clutch sleeve is located in its released position to establish a disconnected mode.

Referring initially to FIG. 8, disconnect sleeve 224 is shown in its disconnected position such that driven spindle 220 is uncoupled from stub shaft 212. As noted, disconnect sleeve 224 has internal splines 226 in constant mesh with external splines 222 on spindle 220. With the disconnect sleeve 224 in its disconnected position, clutch sleeve teeth 226 are disengaged from clutch teeth 218 on drive flange 216. Powered actuator 302 is disclosed, in this non-limiting embodiment, as a solenoid having a plunger 310 linearly moveable relative to actuator housing 306 between extended and retracted positions. Plunger 310 is shown in its extended position such that a drive lug 312 (FIG. 9) fixed to its terminal end is disposed within a tubular guide housing 314 that is fixed within axle housing 190. Spring-loaded shift isolation mechanism 304 generally includes an upper pivot lever 320, a lower pivot lever 322, and a spring assembly 324. Upper pivot lever 320 includes a drive segment 326 and a pivot segment 328. Drive segment 326 includes an aperture (shown in phantom lines in FIG. 8) 330 through which plunger 310 extends and an arcuate outer cam surface 332 against which drive lug 312 engages.

Lower pivot lever 322 includes a spring retainer segment 340, a pivot segment 342, and a fork segment 344. Pivot segment 342 of lower pivot lever 322 defines a pair of bifurcated yokes defining a pivot cavity within which pivot segment 342 of upper pivot lever 320 is located. A pivot post 350 passes through pivot apertures formed in the bifurcated yokes and a pivot bore formed in pivot segment 328 of upper pivot lever 320 to establish a pivotal connection therebetween. The opposite ends of pivot post 350 are retained in mounting bosses (not shown) that are formed in axle housing 190. Fork segment 344 of lower pivot lever 322 is arcuate and defines a pair of laterally-spaced forks. A pair of followers 352 are disposed in an annular groove 354 formed in disconnect sleeve 224 and each follower 352 is pivotably mounted to one of the forks via a pivot pin 356. Spring retainer segment 340 of lower pivot lever 322 includes an aperture (shown in phantom in FIG. 8) 360 and defines a stop face surface 362 configured to selectively engage a first or blocking surface 364 formed on drive segment 326 of upper pivot lever 320.

Spring assembly 324 is shown to include a spring post or bolt 370 extending through aperture 360 in spring retainer segment 340 of lower pivot lever 322 and an aperture (not shown) formed through drive segment 326 of upper pivot lever 320. A fastener, such as a lock nut 372 directly connects a first end of spring bolt 370 to drive segment 326 of upper pivot lever 320. A helical coil spring 374 is retained between a spring retainer feature 376 formed at a second end (i.e., a bolt head) of spring bolt 370 and a second face surface 378 of spring retainer segment 340 on lower pivot lever 322.

Figure 9:
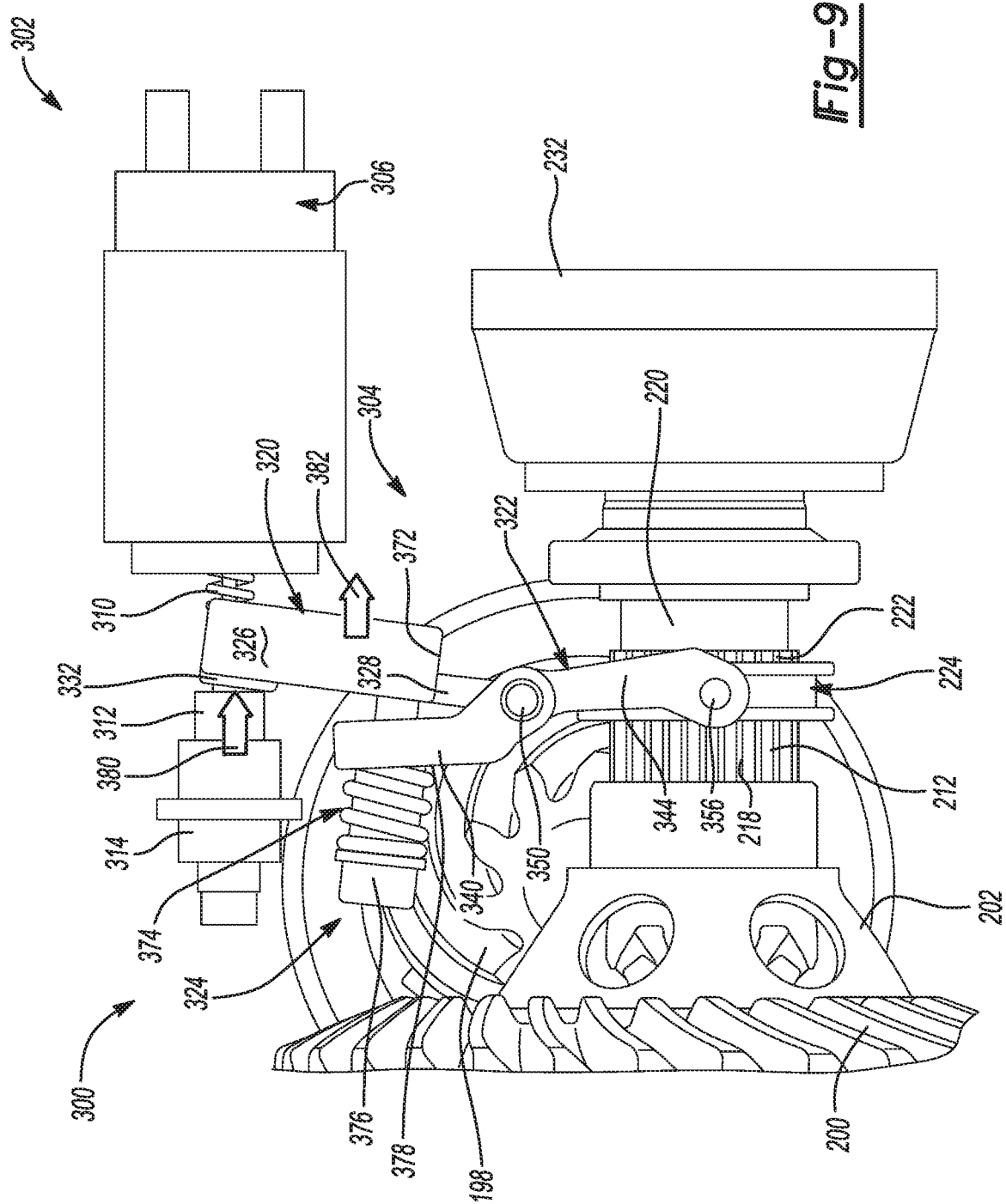
FIG. 9 is similar to FIG. 8 but now illustrates the orientation and positioning of the components when the powered clutch actuator is actuated, the shift isolation mechanism is in a loaded condition, and the clutch sleeve is maintained in its released position due to a blocked shift condition.

With reference now to FIG. 9, plunger 310 of powered actuator 302 is shown moved linearly from its extended position (FIG. 8) to its retracted position relative to actuator housing 306. If no tooth block condition exists between internal clutch teeth 226 on disconnect sleeve 224 and external clutch teeth 218 on drive flange 216, then disconnect sleeve 224 is moved from its disconnected position (FIG. 8) to its connected position (FIG. 12) due to actuation of shift isolation mechanism 304. Specifically, retraction of plunger 310 causes drive lug 312 to engage camming surface 332 and forcibly pivot upper pivot lever 320 about pivot post 350. Spring 374 biases spring retainer segment 340 of lower pivot lever 322 into engagement with drive segment 326 of upper pivot lever 320 such that this pivotal movement of upper pivot lever 320 results in corresponding pivotal movement of lower pivot lever 322 about pivot post 350. Such pivotal movement of lower pivot lever 322 causes followers 352 retained in annular groove 54 to axially move disconnect sleeve 224 into its connected position.

However, FIG. 9 illustrates a blocked tooth condition existing following actuation of actuator 302 to move plunger 310 to its retracted position. As indicated by arrow 380, drive lug 312 engages camming surface 332 and forcibly pivots upper pivot lever in a first or clockwise direction, as indicated by arrow 382. Due to the blocked tooth condition, disconnect sleeve 224 is prevented from moving axially such that lower pivot lever 322 remains stationary relative to upper pivot lever 320 such that spring 374 is compressed between bolt head 376 and second face surface 378 of spring retainer segment 340 on lower pivot lever 322.

Figure 10:
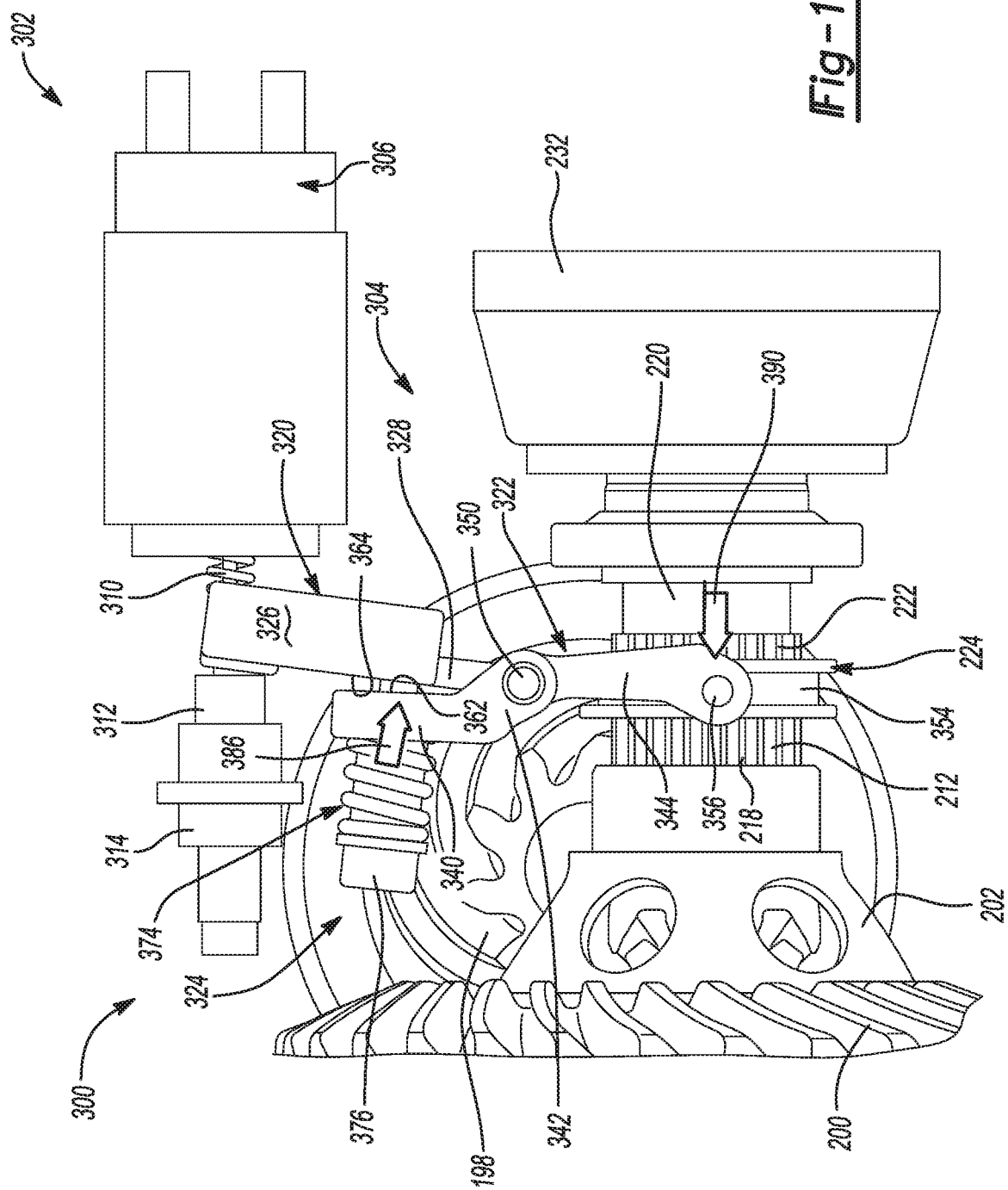
FIGS. 10 and 11 are similar to FIG. 9 but now illustrates the shift isolation mechanism in an unloaded condition with the clutch sleeve moved to its engaged position upon the blocked shift condition being overcome.
Figure 11:
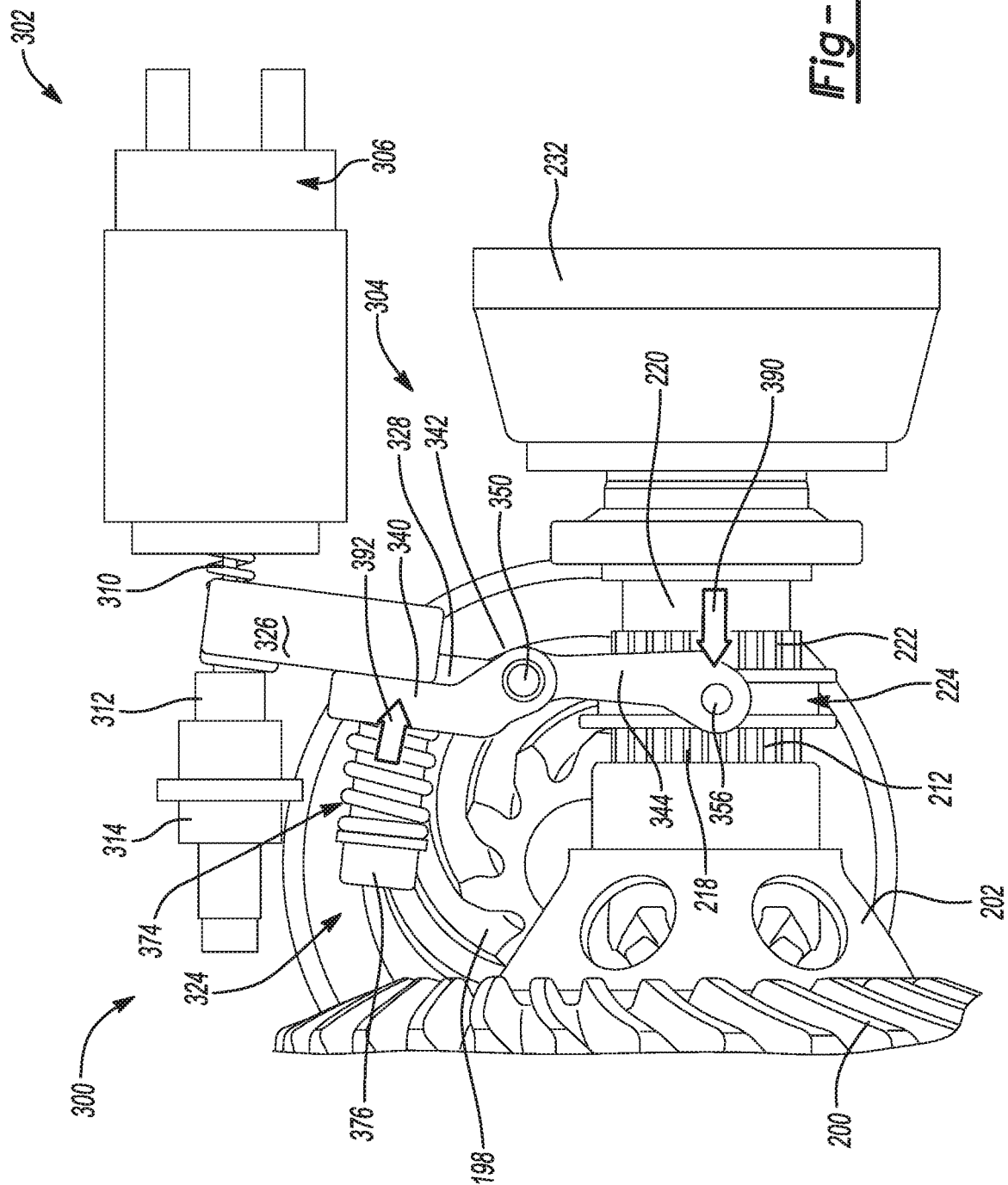
Figure 12:
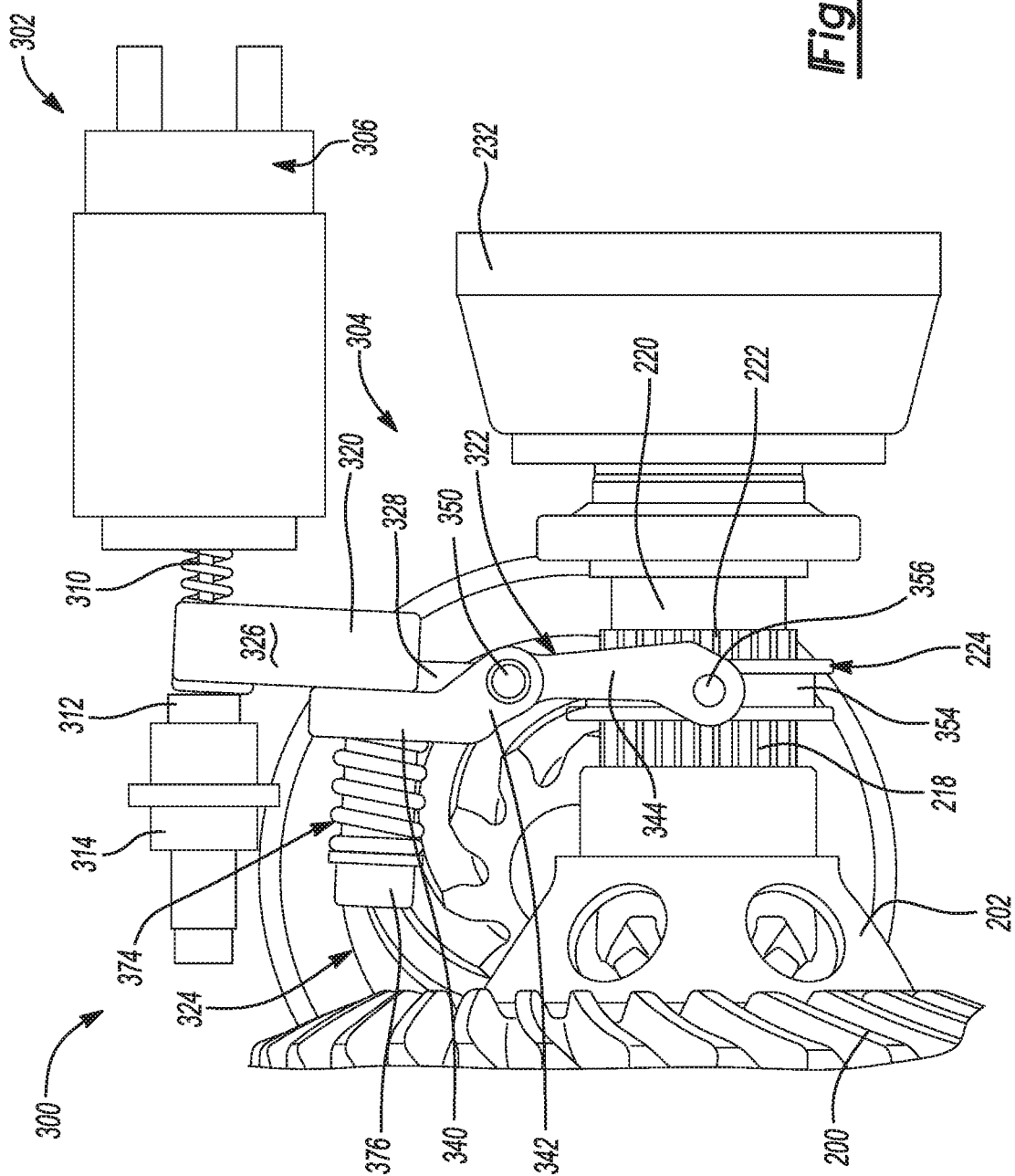
FIG. 12 illustrates the orientation and positioning of the components when the disconnect shift operation has been completed.

FIG. 10 illustrates that, upon removal of the tooth block condition between clutch sleeve teeth 226 and drive flange teeth 218, spring 374 releases the stored spring force and forcibly pivots lower pivot lever 322 about pivot post 350. The spring force applied along arrow 386 results in fork segment 344 of lower pivot lever 322 to forcibly move disconnect sleeve 224 into its connected position due to the shift-force indicated by arrow 390. FIG. 11 illustrates continuation of this action with spring 374 returning spring retainer segment 340 of lower pivot lever 322 into engagement with drive segment 326 of upper pivot lever 322, as indicated by arrow 392. FIG. 12 illustrates completion of the shift process with disconnect sleeve 224 located fully in its connected position. To return disconnect sleeve 224 to its disconnected position, solenoid actuator 302 is subsequently actuated to return plunger 310 to its extended position.

While actuator 302 is disclosed as a solenoid device with an axially extensible plunger 310, other configurations employing an axially translatable output to actuate isolation linkage mechanism 304 are contemplated and considered to be integrated into the scope of this disclosure. One such alternative can include an electric motor-driven drive leadscrew and drive nut type of rotary-to-linear conversion device. The present disclosure provides an arrangement employing a pull-type solenoid actuator 302 for consistently driving a disconnect sleeve 224 via an isolation linkage mechanism 304. When system 300 experiences a blocked shift, mechanism 304 permits solenoid to not be over-loaded during its short term actuation. Once plunger is moved to its retracted position, solenoid energization can cease since the loaded (i.e. compressed) spring 374 provides the subsequent shift force required to move disconnect sleeve 224 once the blocked condition is removed.

Figure 13:
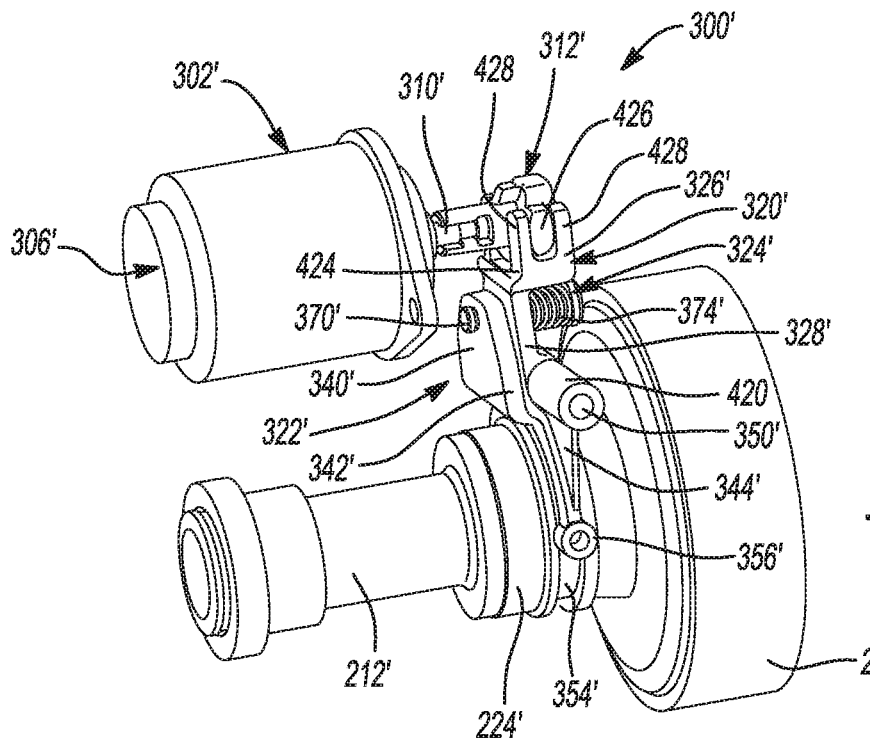
FIG. 13 is an isometric view of an alternative embodiment of the powered clutch actuator and shift isolation mechanism for use with the power-operated disconnect clutch arrangement of the present disclosure.
Figure 14:
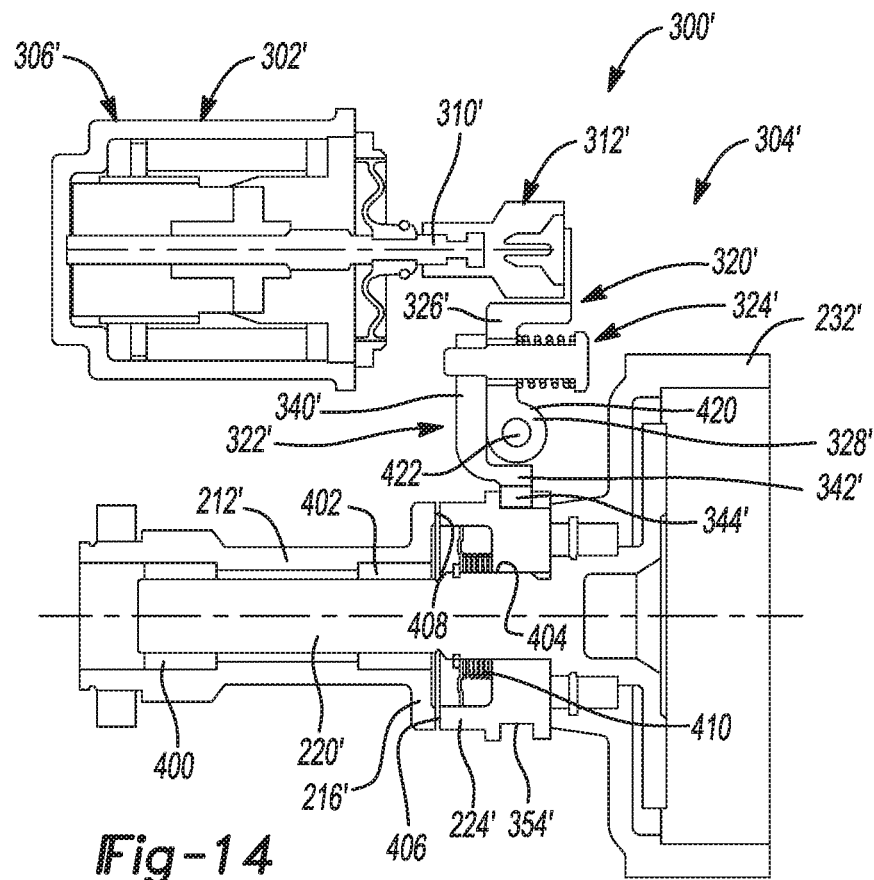
FIG. 14 is a sectional view of the arrangement shown in FIG. 13.

FIGS. 13 and 14 illustrate a slightly modified version of shift system 300, denoted by reference numeral 300'. Note that components of shift system 300' corresponding to those of shift system 300 are identified hereinafter and in the drawings via a "primed" reference numeral. In this arrangement, stub shaft 212' surrounds an elongated driven spindle shaft 220' to which output flange 232' is secured. Bearings 400, 402 rotatably support spindle shaft 220' relative to stub shaft 212'. Disconnect sleeve 224' is splined 404 for rotation with and axial movement on driven spindle 220'. Disconnect sleeve 224' includes face gear teeth 406 configured to matingly engage face gear teeth 408 on a drive flange section 216' of stub shaft 212' when disconnect sleeve 224' is moved into its connected position. A return spring assembly 410 acts between disconnect sleeve 224' and driven spindle shaft 220' to normally bias disconnect sleeve 224' toward its disconnected position. Bosses 420 extending from pivot segment 342' of lower pivot link 322' are hollow and permit pivot post 350' to pass therethrough and through aperture 422 in pivot segment 328' of upper pivot lever 320'. As is also shown, a drive lug 312' is mounted to the terminal end of plunger 310' and cooperates with a yoke portion 424 of drive segment 326' on upper pivot lever 320'. Drive lug 312' has projections 426 retained between yoke tangs 428 to accommodate misalignment and slight radial movement between plunger 310' and upper pivot lever 320'.

Shift system 300' functions similarly to shift system 300 in that pull-in movement of plunger 310' upon energization of solenoid 302' from its extended position to its retracted position results in pivotal movement of upper pivot lever 320' about pivot post 350'. In a non-blocked situation, such movement results in coordinated pivotal movement of lower pivot lever 322' about pivot post 350' so as to axially move disconnect sleeve 224' to its connected position with engagement of its face teeth 406 with face teeth 408 on drive flange 216'. In the event of a blocked shift condition, spring assembly 324' is loaded via compression of spring 374' due to pivotal movement of upper pivot lever 320' relative to lower pivot lever 322'. Once the blocked condition between face clutch teeth 406, 408 has been eliminated, the spring force is released and forcibly pivots lower pivot lever 322' to complete the clutch shift operation.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A clutch assembly, comprising:
a first rotary member;
a second rotary member;
a clutch sleeve coupled for rotation with the first rotary member and being axially moveable between a first position and a second position, the clutch sleeve having first clutch teeth disengaged from second clutch teeth formed on the second rotary member when located in its first position, and the first clutch teeth on the clutch sleeve being engaged with the second clutch teeth when located in its second position;
a power-operated clutch actuator having an output member moveable between a first position and a second position; and
a shift isolation mechanism operably interconnecting the output member to the clutch sleeve such that movement of the output member between its first and second positions causes corresponding movement of the clutch sleeve between its first and second position, wherein the shift isolation mechanism includes a biasing arrangement configured to permit movement of the output member from its first position to its second position while a blocked tooth condition between the first and second clutch teeth inhibits movement of the clutch sleeve from its first position to its second position, and wherein the biasing arrangement is subsequently released and forcibly moves the clutch sleeve from its first position to its second position when the blocked tooth condition is removed;
wherein the shift isolation mechanism further includes an upper pivot lever and a lower pivot lever, wherein the upper pivot lever includes a drive segment engaging the output member of the power-operated actuator and a first pivot segment pivotable along a pivot post segment, and wherein the lower pivot lever includes a second pivot segment pivotably connected to the first pivot segment of the upper pivot lever at the pivot post segment, and a fork segment located opposite the second pivot segment relative to the pivot post segment and coupled to the clutch sleeve;

wherein the biasing arrangement includes a spring post having a first end fixed to the drive segment of the upper pivot lever and defining a spring retainer feature at a second end.

2. The clutch assembly of claim 1, wherein the lower pivot lever further includes a spring retainer segment at the second pivot segment, the spring retainer segment having a face surface, and wherein a spring is located about the spring post and has a first end acting on the face surface of the spring retainer segment and a second end acting on the spring retainer feature of the spring post in order to retain the spring of the biasing arrangement relative to the second pivot segment.

3. The clutch assembly of claim 2, wherein an intermediate portion of the spring post extends through an aperture formed in the spring retainer segment of the lower pivot lever.

4. The clutch assembly of claim 2, wherein the power-operated clutch actuator is a solenoid having a linearly moveable plunger acting as the output member, wherein the first position of the plunger is an extended position relative to the solenoid such that the shift isolation mechanism locates the clutch sleeve in its first position, and wherein the second position of the plunger is a retracted position relative to the solenoid such that the plunger engages the drive segment of the upper pivot lever and causes pivotal movement of the upper and lower pivot members.

5. The clutch assembly of claim 4, wherein pivotal movement of the lower pivot lever is inhibited during the blocked tooth condition such that the coil spring is loaded by pivotal movement of the upper pivot lever relative to the lower pivot lever, and wherein the coil spring is unloaded in response to elimination of the tooth block condition such that it forcibly pivots the lower pivot lever for moving the clutch sleeve from its first position to its second position.

6. The clutch assembly of claim 4, wherein a drive lug is provided at the terminal end of the plunger and is configured to engage a cam surface formed on the drive segment of the upper pivot lever.

7. The clutch assembly of claim 6, wherein the drive lug is slideably moveable relative to a stationary tubular guide housing.

8. The clutch assembly of claim 1, wherein the clutch assembly is a mode clutch in a power take-off unit.

9. The clutch assembly of claim 1, wherein the clutch assembly is a disconnect clutch in a disconnect coupling.

10. The clutch assembly of claim 1, wherein the biasing arrangement of the shift isolation mechanism permits movement of the output member to its second position while the clutch assembly is in the blocked tooth condition.

11. The clutch assembly of claim 2, wherein the biasing arrangement of the shift isolation mechanism includes a spring assembly having a spring bolt extending between the upper pivot member and the lower pivot member, and the spring surrounding the spring bolt, and wherein pivotal movement between the upper pivot member and the lower pivot member loads the spring in a blocked tooth condition and unloads the spring after elimination of the blocked tooth condition, forcibly pivoting the lower pivot lever to move the clutch sleeve.

12. The clutch assembly of claim 1, wherein the fork segment of the lower pivot lever is located opposite the second pivot segment relative to the pivot post segment along an axis extending perpendicularly to an axis of rotation of the pivot post segment.

13. A clutch assembly, comprising:
a first rotary member;
a second rotary member;
a clutch sleeve coupled for rotation with the first rotary member and being axially moveable between a first position and a second position, the clutch sleeve having first clutch teeth disengaged from second clutch teeth formed on the second rotary member when located in its first position, and the first clutch teeth on the clutch sleeve being engaged with the second clutch teeth when located in its second position;
a power-operated clutch actuator having an output member moveable between a first position and a second position; and
a shift isolation mechanism operably interconnecting the output member to the clutch sleeve such that movement of the output member between its first and second positions causes corresponding movement of the clutch sleeve between its first and second position, wherein the shift isolation mechanism includes a biasing arrangement configured to permit movement of the output member from its first position to its second position while a blocked tooth condition between the first and second clutch teeth inhibits movement of the clutch sleeve from its first position to its second position, and wherein the biasing arrangement is subsequently released and forcibly moves the clutch sleeve from its first position to its second position when the blocked tooth condition is removed;
wherein the shift isolation mechanism further includes an upper pivot lever and a lower pivot lever, wherein the upper pivot lever includes a drive segment engaging the output member of the power-operated actuator and a first pivot segment pivotable along a pivot post segment, and wherein the lower pivot lever includes a second pivot segment pivotably connected to the first pivot segment of the upper pivot lever at the pivot post segment, and a fork segment located opposite the second pivot segment relative to the pivot post segment and coupled to the clutch sleeve;
wherein the biasing arrangement biases the second pivot segment against the upper pivot lever when no tooth block condition exists, and wherein the biasing arrangement is spaced from the upper pivot lever when the tooth block condition exists.

14. A clutch assembly, comprising:
a first rotary member;
a second rotary member;
a clutch sleeve coupled for rotation with the first rotary member and being axially moveable between a first position and a second position, the clutch sleeve having first clutch teeth disengaged from second clutch teeth formed on the second rotary member when located in its first position, and the first clutch teeth on the clutch sleeve being engaged with the second clutch teeth when located in its second position; and
a power-operated clutch actuator having an output member moveable between a first position and a second position;
a shift isolation mechanism operably interconnecting the output member to the clutch sleeve such that movement of the output member between its first and second positions causes corresponding movement of the clutch sleeve between its first and second position, wherein the shift isolation mechanism includes a biasing arrangement configured to permit movement of the output member from its first position to its second position while a blocked tooth condition between the first and second clutch teeth inhibits movement of the clutch sleeve from its first position to its second position, and wherein the biasing arrangement is subsequently released and forcibly moves the clutch sleeve from its first position to its second position when the blocked tooth condition is removed;

wherein the shift isolation mechanism further includes an upper pivot lever and a lower pivot lever, wherein the upper pivot lever is configured to include a drive segment engaging the output member of the power-operated actuator and a first pivot segment, and wherein the lower pivot lever includes a spring retainer segment, a second pivot segment pivotably connected to the first pivot segment of the upper pivot lever, and a fork segment coupled to the clutch sleeve;

wherein the biasing arrangement is configured to include a spring post having a first end fixed to the drive segment of the upper pivot lever and a second end defining a spring retainer, and a coil spring surrounding the spring post and having a first end acting on the spring retainer segment of the lower pivot lever and a second end acting on the spring retainer on the second end of the spring post.

\* \* \* \* \*